United States Patent
Lerede et al.

(10) Patent No.: US 9,050,979 B2
(45) Date of Patent: Jun. 9, 2015

(54) DAMPING OF POWER TRAIN OSCILLATIONS

(75) Inventors: Niclas Lerede, Södertälje (SE); Henrik Flemmer, Hägersten (SE)

(73) Assignee: SCANIA CV AB (SE)

( * ) Notice: Subject to any disclaimer, the term of this patent is extended or adjusted under 35 U.S.C. 154(b) by 49 days.

(21) Appl. No.: 13/984,901

(22) PCT Filed: Feb. 21, 2012

(86) PCT No.: PCT/SE2012/050186
§ 371 (c)(1),
(2), (4) Date: Aug. 12, 2013

(87) PCT Pub. No.: WO2012/115580
PCT Pub. Date: Aug. 30, 2012

(65) Prior Publication Data
US 2013/0325277 A1  Dec. 5, 2013

(30) Foreign Application Priority Data

Feb. 23, 2011  (SE) ...................... 1150149

(51) Int. Cl.
G06F 7/70 (2006.01)
B60W 30/20 (2006.01)
B60W 50/00 (2006.01)
F02D 41/14 (2006.01)
B60W 10/04 (2006.01)

(52) U.S. Cl.
CPC .............. *B60W 30/20* (2013.01); *B60W 10/04* (2013.01); *B60W 50/0098* (2013.01); *B60W 2050/0039* (2013.01); *B60W 2050/0056* (2013.01); *B60W 2050/0057* (2013.01); *B60W 2510/0638* (2013.01); *B60W 2710/0666* (2013.01); *F02D 41/1498* (2013.01); *F02D 2200/101* (2013.01); *F02D 2200/1012* (2013.01); *F02D 2250/18* (2013.01); *F02D 2250/28* (2013.01)

(58) Field of Classification Search
None
See application file for complete search history.

(56) References Cited

U.S. PATENT DOCUMENTS 3,103,210 A * 9/1963 Campbell et al. ............ 123/378
4,922,869 A   5/1990 Kadomukai et al. ....... 123/192.1
(Continued)

FOREIGN PATENT DOCUMENTS

DE  40 09 791    10/1991
EP  1097834 A3   3/2002
(Continued)

OTHER PUBLICATIONS

"Torsional Vibration", Wikipedia, all pages, date unknown, retrieved from http://en.wikipedia.org/wiki/Torsional_vibration.*
(Continued)

*Primary Examiner* — Calvin Cheung
(74) *Attorney, Agent, or Firm* — Ostrolenk Faber LLP

(57) ABSTRACT

A method for damping of a power train oscillation in a vehicle provided with a prime mover which delivers a torque related to a torque request M from a vehicle system and rotates at a speed ω. A cyclic variation S in the rotation speed ω of said prime mover is determined. The torque request M is then given an oscillation-damping characteristic by use of the cyclic variation S, making it possible for the power train oscillation to be effectively damped out.

16 Claims, 6 Drawing Sheets

(56) References Cited

U.S. PATENT DOCUMENTS

| | | | | |
|---|---|---|---|---|
| 5,119,783 | A | | 6/1992 | Komurasaki ................. 123/425 |
| 5,533,415 | A | * | 7/1996 | Ackermann et al. ............ 74/7 E |
| 5,725,456 | A | * | 3/1998 | Fischer et al. ................. 477/174 |
| 5,994,859 | A | * | 11/1999 | Deng et al. .................... 318/432 |
| 6,039,028 | A | | 3/2000 | Stuntz et al. .................. 123/436 |
| 6,350,224 | B1 | | 2/2002 | Cordaro et al. ................. 494/7 |
| 7,406,939 | B2 | | 8/2008 | Asahara et al. ............ 123/192.1 |
| 8,352,140 | B2 | | 1/2013 | Herter et al. .................... 701/67 |
| 2003/0062859 | A1 | * | 4/2003 | Amann et al. ................. 318/114 |
| 2005/0115346 | A1 | * | 6/2005 | Sakamoto et al. .............. 74/335 |
| 2005/0182545 | A1 | * | 8/2005 | Baumann et al. ............... 701/53 |
| 2007/0203632 | A1 | | 8/2007 | Saitou ............................ 701/51 |
| 2007/0225888 | A1 | * | 9/2007 | Morris ........................... 701/51 |
| 2008/0154468 | A1 | * | 6/2008 | Berger et al. ................... 701/54 |
| 2008/0288146 | A1 | * | 11/2008 | Beechie et al. ................. 701/58 |
| 2009/0312143 | A1 | * | 12/2009 | Allgaier et al. ................... 477/5 |
| 2010/0087996 | A1 | * | 4/2010 | Haggerty et al. ............... 701/58 |
| 2011/0029208 | A1 | * | 2/2011 | Xia ................................ 701/58 |

FOREIGN PATENT DOCUMENTS

| | | |
|---|---|---|
| EP | 2 070 798 | 6/2009 |
| EP | 2 275 315 | 1/2011 |
| JP | 2001-132501 | 5/2001 |
| JP | 2007-218138 | 8/2007 |
| JP | 2007-231875 | 9/2007 |
| JP | 2009-167949 | 7/2009 |
| JP | 2010-059978 | 3/2010 |

OTHER PUBLICATIONS

William Strunk Jr. and E.B. White, The Elements of Style 3rd Ed., 1979, all pages.*
International Search Report mailed Jul. 16, 2012 in corresponding PCT International Application No. PCT/SE2012/050186.
International Search Report dated Jul. 16, 2012 issued in corresponding International Patent Application No. PCT/SE2012/050188.
Japanese Office Action, dated Nov. 4, 2015, issued in corresponding Japanese Patent Application No. 2013-555389. English translation. Total 3 pages.

* cited by examiner

DAMPING OF POWER TRAIN OSCILLATIONS

CROSS-REFERENCE TO RELATED APPLICATIONS

The present application is a 35 U.S.C. §§371 national phase conversion of PCT/SE2012/050186, filed Feb. 21, 2012, which claims priority of Swedish Application No. 1150149-1, filed Feb. 23, 2011, the contents of which are incorporated by reference herein. The PCT International Application was published in the English language.

TECHNICAL FIELD

The present invention relates to a method for damping of a power train oscillation in a vehicle to a computer program for implementing the method and to a system for damping of a power train oscillation.

BACKGROUND

FIG. 1 depicts schematically an example of a heavy vehicle 100, e.g. a truck, bus or the like. The vehicle 100 schematically depicted in FIG. 1 has a pair of forward wheels 111, 112 and a pair of powered rear wheels 113, 114. It further has a power train with a prime mover 101 which may for example be a combustion engine, an electric motor or a combination of both, i.e. a so-called hybrid. The prime mover 101 may for example be connected in a conventional way, via an output shaft 102 leading from it, to a gearbox 103, possibly via a clutch 106. An output shaft 107 from the gearbox 103 drives the powered wheels 113, 114 via a final gear 108, e.g. a conventional differential, and driveshafts 104, 105 which are connected to said final gear 108. If for example the prime mover 101 takes the form of an electric motor, it may also be connected directly to the output shaft 107 or the driveshafts 104, 105.

A driver of the vehicle increasing a torque request to the prime mover 101 by, for example, input via an input means, e.g. by depressing an accelerator pedal, may cause a relatively rapid torque change in the power train. This torque is resisted by the powered wheels 113, 114 through their friction against the ground and the vehicle's rolling resistance. The driveshafts 104, 105 are thus subject to a relatively substantial twisting moment.

Inter alia for cost and weight reasons, the driveshafts are as a rule not dimensioned to cope with this substantial stress without being affected. Owing to their relative weakness, the driveshafts 104, 105 act instead like torsion springs between the powered wheels 103, 104 and the final gear 108.

When its rolling resistance is no longer sufficient to resist the torque from the power train, the vehicle 100 begins to roll, whereupon the torsion-springlike force in the driveshafts 103, 104 is released. When the vehicle moves off, this released force may result in power train oscillations, causing the vehicle to rock in the longitudinal direction, i.e. in its direction of movement. A driver of the vehicle is likely to find this rocking very unpleasant. He/she will prefer a gentle and pleasant driving experience such as to also create the impression that the vehicle is a refined and well-developed product. It is therefore necessary to be able to quickly detect and effectively damp out such power train oscillations.

Previous known solutions for damping of power train oscillations have been technically complicated, contributing to increased computational complexity and implementation cost. The previous known complicated solutions have also led to ineffective damping of these oscillations, with consequently unsatisfactory results as regards damping out power train oscillations.

BRIEF DESCRIPTION OF THE INVENTION

An object of the present invention is to propose a method for damping of power train oscillations. This object is achieved by the aforesaid method according to the invention. It is also achieved by the aforesaid computer programme according to the invention. It is also achieved by the aforesaid system for damping of power train oscillations according to the invention.

According to the present invention, these oscillations are therefore damped by using the change in cyclic variation S of the rotational speed of the prime mover. A torque request M sent to the vehicle's prime mover is here modified by a contribution to torque request $M_c$ which has a damping effect on the power train oscillations. The fact that the pattern of the modified torque request M is determined on the basis of the change in cyclic variation S means that the power train oscillations can be quickly damped out.

According to an embodiment of the invention, the change in cyclic variation S is arrived at by derivation of an inverted version of a superimposed variation $\omega_s$ in the prime mover rotation speed $\omega$. The derivation results in the amplitude of the modified torque request M being greatest when the inverted version of the superimposed variation $\omega_s$ changes most. The cyclic variation of the torque request is also substantially inverted and displaced in time from the superimposed variations of the prime mover rotation speed. The overall result is that the power train oscillations are quickly damped out.

According to the present invention, the damping of power train oscillations uses only prime mover-related signals which are already used in regulating systems of today's motor vehicles. More specifically, the invention uses the prime mover's rotation speed $\omega$. This means that the solution according to the present invention can be implemented with very little additional complexity, whether in calculations or in actual implementation.

The damping of power train oscillations is based on a change in cyclic variation S in the prime mover's rotation speed $\omega$, which means that reliable damping can be effected substantially without delays. This is a great advantage compared with previous known systems which have resulted in unreliable and late damping.

According to an embodiment of the invention, power train oscillations are detected on the basis of the change in cyclic variation S such that a power train oscillation will be detected if for a predetermined number of times the amplitude of the change in cyclic variation S is alternately above a positive threshold value $Th_1$ and below a negative threshold value $Th_2$ and each pair of consecutive upward/downward threshold crossings occurs within a predetermined period T.

The overall result of the present invention is very effective detection and damping of the oscillations, based on analysis of the change in cyclic variation S and achievable with very little additional complexity.

BRIEF LIST OF DRAWINGS

The invention is explained in more detail below with reference to the attached drawings, in which the same reference notations are used for similar items, and in which:

FIG. 1 depicts a motor vehicle;

FIG. 2a plots a prime mover rotation speed against time;

FIG. 2b plots an inverted version of a superimposed cyclic change in rotational speed of the prime mover against time;

FIG. 2c plots a derivative of an inverted version of a superimposed cyclic change in rotational speed of the prime mover against time;

FIG. 2d plots a derivative of an inverted version of a superimposed cyclic change in rotational speed of the prime mover against threshold values and time;

FIG. 3a plots an oscillation-damping torque request against time;

DESCRIPTION OF PREFERRED EMBODIMENTS

Figure 1:
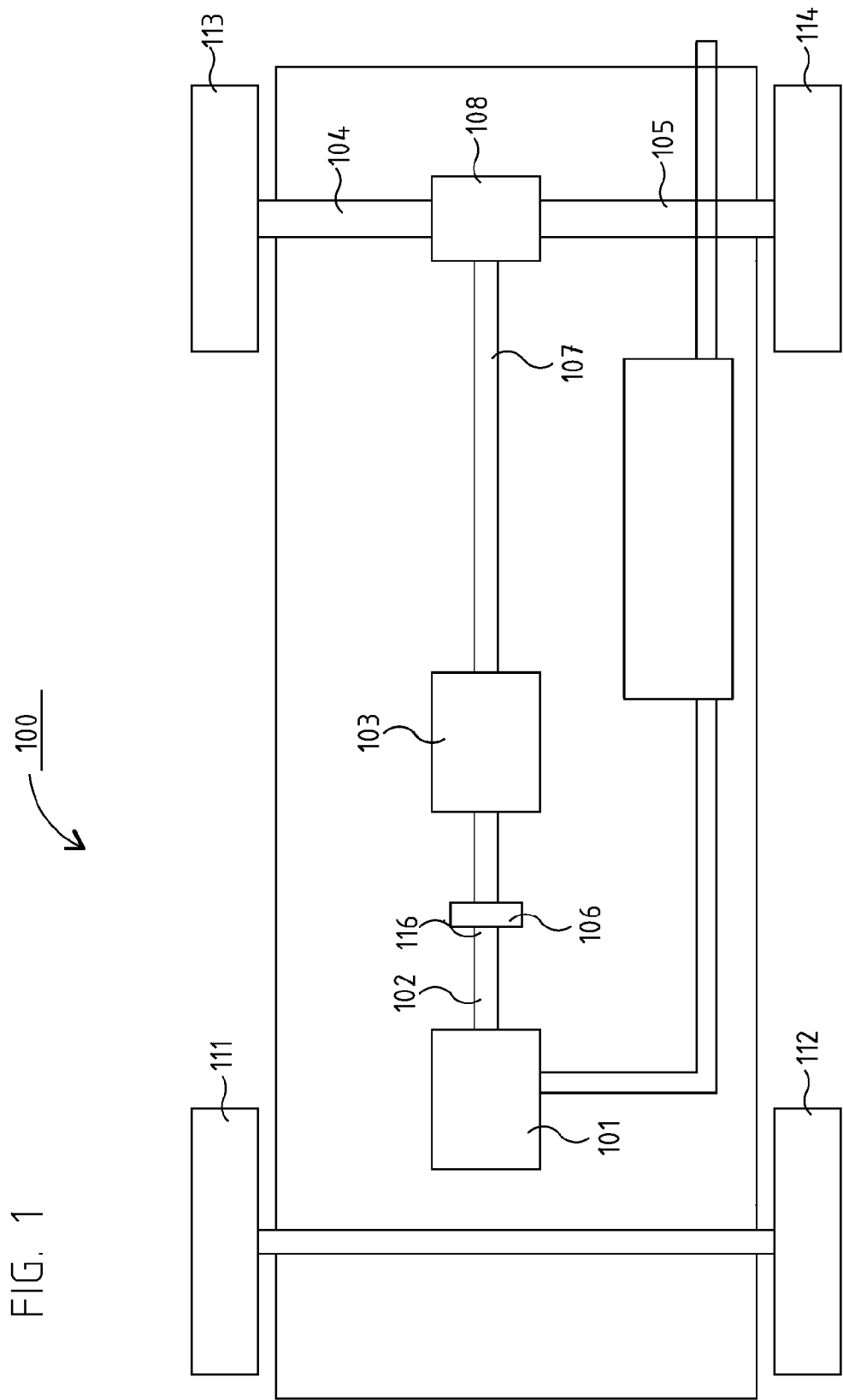

According to the present invention, power train oscillations can be detected and damped by analysis of a change in cyclic variation S in the rotation speed $\omega$ of the prime mover 101. This involves first determining this change in cyclic variation S and then analysing its pattern. The damping of a power train oscillation according to the invention uses this analysis of change in cyclic variation S by using change in cyclic variation S in arriving at a oscillation-damping torque request M.

The vehicle 100 has a prime mover 101 which imparts a torque. The torque imparted is related to a torque request M which may be a direct result of driver input, e.g. via an accelerator pedal, or be demanded by some kind of cruise control or other device adapted to demanding torque from the prime mover 101.

Detecting a power train oscillation may be based on the change in cyclic variation S. According to the invention, if a power train oscillation is detected, a torque request M is conveyed to the prime mover with an oscillation-damping characteristic for the power train oscillations to be counteracted and damped out. The oscillation-damping characteristic is here obtained by using the change in cyclic variation S. Basing the damping of the power train oscillations solely on the prime mover rotation speed $\omega$ has very substantial advantages with regard to complexity of implementation and effectiveness of damping.

According to an embodiment of the present invention, this change in cyclic variation S, multiplied by at least one amplification factor $A_1$, is added to an original torque request $M_o$ to create the torque request M which is sent to the prime mover 101. The original torque request $M_o$ is here based on signals from, for example, an accelerator pedal and/or a cruise control, as described above. The at least one amplification factor $A_1$ may be given any suitable value, which may be constant or variable as described in more detail below.

According to an embodiment of the invention, damping of the oscillation according to the invention is only effected when power train oscillations have been detected. This reduces the complexity in the system according to the invention.

According to an embodiment of the invention, there is deemed to be a power train oscillation if for a predetermined number of times the amplitude of the change in cyclic variation, i.e. the amplitude of a signal related to the change in cyclic variation S, is alternately above a positive threshold value $Th_1$ and below a negative threshold value $Th_2$ and each pair of consecutive upward and downward threshold crossings, i.e. respectively above this positive threshold value $Th_1$ and below this negative threshold value $Th_2$, occur within a predetermined period T. Two consecutive upward and downward threshold crossings are therefore here separated in time by not more than a predetermined period T.

In other words, there are deemed to be power train oscillations if for a certain number of times within the predetermined period T from the time of an upward/downward crossing of a threshold $Th_1$, $Th_2$ the amplitude of the change in cyclic variation is below/above another threshold $Th_1$, $Th_2$ which bear different signs. For the amplitude of the change in cyclic variation S thus here to be alternating for a certain number of times, it will have a magnitude above the positive threshold value $Th_1$ and a magnitude below the negative threshold value $Th_2$ and make two consecutive threshold crossings within the predetermined period T.

Being able, with this embodiment of the present invention, to detect power train oscillations on the sole basis of the prime mover rotation speed $\omega$ is highly advantageous in that this speed $\omega$ is normally available in any case in the vehicle. Previous known methods for detecting power train oscillations have been based also on further signals, e.g. signals related to wheel speeds, resulting in detection which has involved further sensors and greater complexity. The damping of power train oscillations may also be based solely on the prime mover rotation speed $\omega$, thereby simplifying the damping system. The change in cyclic variation S arrived at the time of detection may also be used in the damping, so computational complexity is minimised by the present invention.

Detection of power train oscillations according to the invention is exemplified below with reference to FIGS. 2a to 2d, using schematic and non-limitative examples of signals to explain the invention.

According to an embodiment of the present invention, detection is based on the change in cyclic variation S in a rotation speed $\omega$ of the prime mover 101. This rotation speed $\omega$ may be determined by using a sensor 116 which may be situated close to the clutch 106 to enable it to detect the rotation speed $\omega$ imparted by the prime mover 101. The rotation speed $\omega$ may also be determined by using a model configured to make it easy to arrive at the rotation speed $\omega$ of the prime mover.

Figure 2A:
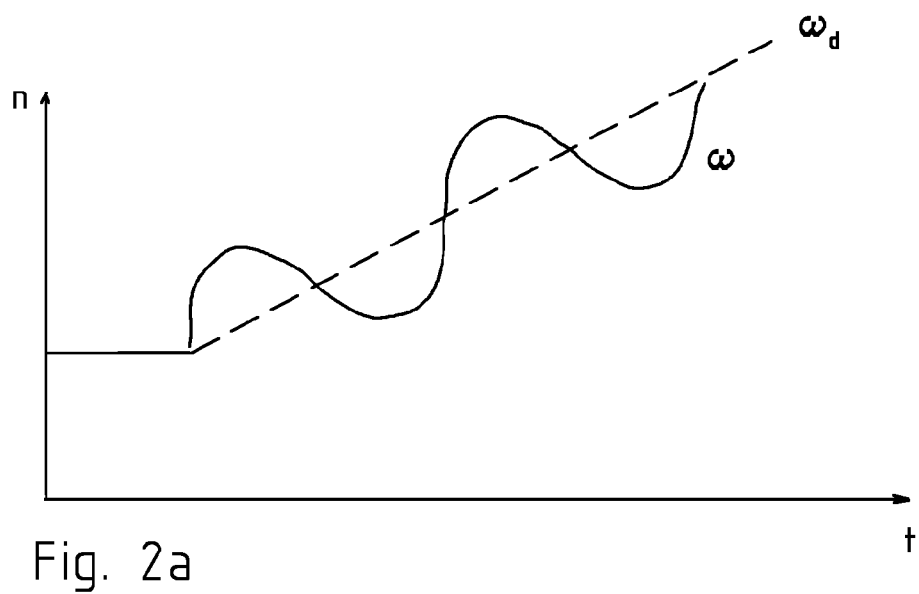
Figure 2B:
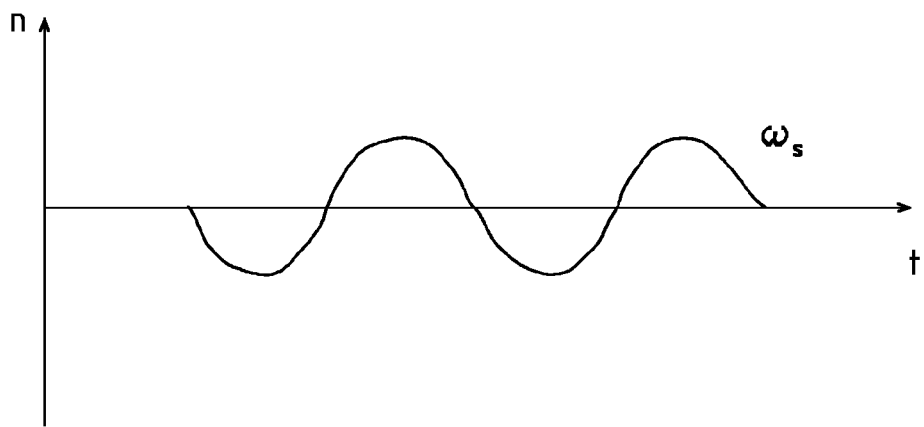
Figure 2C:
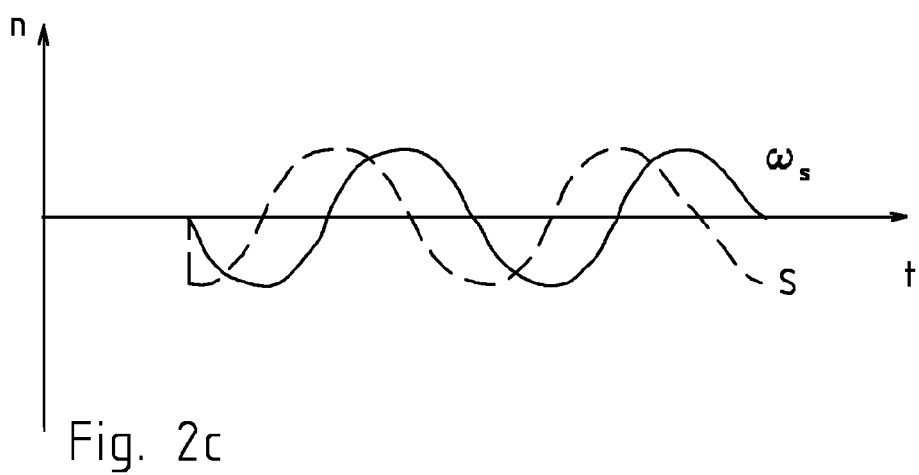

When power train oscillation occurs, the rotation speed $\omega$ of the prime mover 101 may comprise a superimposed cyclic variation. FIG. 2a plots schematically an example of a desired prime mover rotation speed $\omega_d$ (broken line) against time. This rotation speed $\omega_d$ begins in this example at a first speed, e.g. 500 rev/min, followed by linear increase over time. FIG. 2a also depicts an example of the actual pattern of a rotation speed $\omega$ (continuous line) when measured by a sensor 116 or determined in some other way, e.g. by means of a model for the rotation speed $\omega$.

FIG. 2a shows the prime mover rotation speed $\omega$ comprising the desired rotation speed $\omega_d$ and a superimposed cyclic variation. The rocking in the longitudinal direction of the vehicle 100 is related to this superimposed cyclic variation.

In detection of power train oscillations there is normally no access to the desired rotation speed $\omega_d$ but only to a signal corresponding to the rotation speed $\omega$. According to an embodiment of the present invention, the desired rotation speed $\omega_d$ may be arrived at by putting the signal for the rotation speed $\omega$ through a filter, more specifically a low-pass (LP) filter. When the LP filter is chosen such that the superimposed cyclic variations of the rotation speed $\omega$ are above its pass band, the pattern of the desired rotation speed $\omega_d$ may therefore be determined by this LP filtering.

According to an embodiment of the present invention, an inverted version of the superimposed cyclic variation $\omega_s$ in the rotation speed $\omega$ may then be arrived at by subtracting the rotation speed $\omega$ from the desired rotation speed $\omega_d$. The inverted version of the superimposed cyclic variation $\omega_s$ resulting from this subtraction is depicted schematically in FIG. 2b. As the rotation speed $\omega$ has been subtracted from the desired rotation speed $\omega_d$, the inverted version of the superimposed cyclic variation $\omega_s$ is around the speed of 0 rev/min, i.e. around the x axis in FIG. 2b. As the rotation speed $\omega$ has been subtracted from the desired rotation speed $\omega_d$, the inverted version of the superimposed cyclic variation $\omega_s$ also has a pattern whereby the waveform of the inverted version of the superimposed cyclic variation $\omega_s$ is substantially inverted relative to the waveform of the cyclic variations of the rotation speed $\omega$.

A person skilled in the relevant art will appreciate that the aforesaid subtraction may also be done by, for example, first inverting, i.e. changing the sign of the amplitude of, a signal for the rotation speed $\omega$ and then adding a signal for the desired rotation speed $\omega_d$. The subtraction may also be done, for example, by subtracting a signal for the desired rotation speed $\omega_d$ from a signal for the rotation speed $\omega$ and then inverting, i.e. changing the sign of, the signal for the result of this subtraction.

According to another embodiment of the present invention, the inverted version of the superimposed cyclic variation $\omega_s$ is instead determined by means of a model for it. According to an embodiment, this model for determining the inverted version of the superimposed cyclic variation $\omega_s$ takes the form of a "two-mass model" comprising two oscillatory masses with a weakness between them. Two oscillatory masses are thus modelled, viz. a first representing the prime mover 101 and a second representing the wheels 111, 112, 113, 114 and the vehicle's surroundings. Each of the first and second oscillatory masses has according to the model a respective weight and rotates at a respective speed. The first and second oscillatory masses are respectively acted upon by first and second torques, the first torque being an imparted prime mover torque compensated by gearing, and the second being the torque by which the surroundings act upon the vehicle. The weakness between these oscillatory masses is modelled as a damped spring.

In all, this model has three states, viz. a first state representing the prime mover's rotation speed $\omega$, a second state representing the rotation speed of the wheels and a third state representing an angular difference between them, i.e. an angling of the driveshafts. From this model it is then possible to arrive at the rotation speed $\omega$ and resilient angling and to determine from these the inverted version of the superimposed cyclic variation $\omega_s$.

As mentioned above, power train oscillations can be detected by analysis of a change in cyclic variation S in the rotation speed $\omega$ of the prime mover 101. To arrive at a change in cyclic variation S for the rotation speed $\omega$ from the inverted version of the superimposed cyclic variation $\omega_s$, the latter is derived with respect to time, according to an embodiment of the present invention. The inverted version of the superimposed cyclic variation $\omega_s$ (continuous line) and its derivative, i.e. the change in cyclic variation S for the rotation speed $\omega$ (broken line), are depicted schematically in FIG. 2c. When the change in cyclic variation S takes the form of the derivative of the inverted version of the superimposed cyclic variation $\omega_s$, it represents a change in the inverted version of the superimposed cyclic variation $\omega_s$ over time.

Analysis of the change in cyclic variation S involves using at least two thresholds related to its amplitude. According to the invention, there is deemed to be a power train oscillation if for a predetermined number of times the amplitude of the change in cyclic variation is alternately above/below (i.e. crosses) the two respective positive and negative threshold values $Th_1$, $Th_2$ and if for the predetermined number of times each of two consecutive upward/downward threshold crossings occur within a predetermined period T from one another. All of the consecutive crossings may thus be separated in time by not more than this predetermined period T for the power train oscillation to be deemed detected.

Suitable threshold values $Th_1$, $Th_2$ may be arrived at empirically, i.e. by tests, or be simulated. Suitable lengths of the predetermined period T may also be arrived at empirically, i.e. by tests, or be simulated. The length of the predetermined period T and/or the threshold values $Th_1$, $Th_2$ depend on the frequency of the inverted superimposed cyclic variations $\omega_s$ and/or the noise level of sensors in the system. In general terms, the chosen threshold values $Th_1$, $Th_2$ and/or period T should be such as to avoid incorrect detection of power train oscillations owing to unsteady signals etc.

Figure 2D:
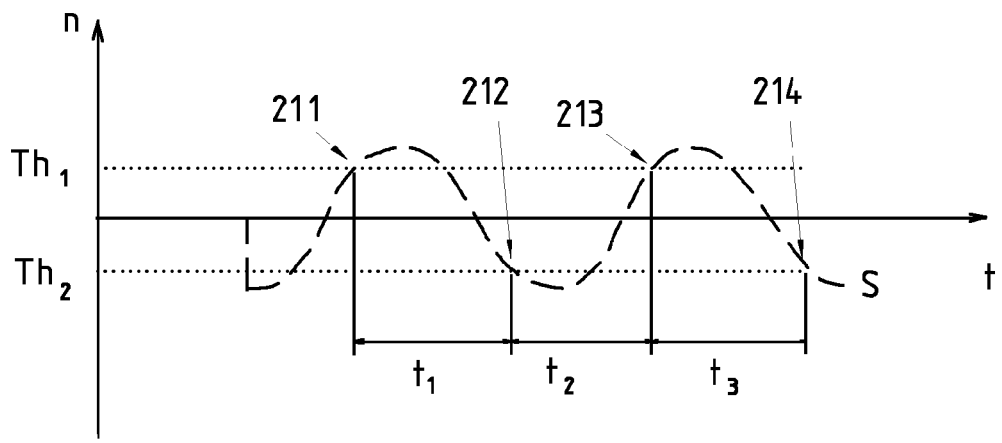

FIG. 2d plots the change in cyclic variation S (broken line) against time, and two thresholds $Th_1$, $Th_2$, viz. a first threshold with a positive value $Th_1$ and a second threshold with a negative value $Th_2$. According to the present invention, a power train oscillation is deemed detected if for a predetermined number of times the change in cyclic variation S with alternating signs is above/below these thresholds $Th_1$, $Th_2$ and if all of the consecutive upward/downward threshold crossings 211/212, 212/213 and 213/214 occur within a predetermined period T from the respective latest upward/downward crossings 211, 212 and 213.

As may be seen in the example in FIG. 2d, the change in cyclic variation S has initially at a time 211 a positive amplitude greater than the first threshold value $Th_1$, at the beginning of a first period $t_1$. At a second time 212 such that the first period $t_1$ is shorter than the predetermined period T, i.e. $t_1 < T$, the change in cyclic variation S has an amplitude lower than the second threshold value $Th_2$. At a third time 213, which here occurs within a period $t_2$ which runs from the previous downward crossing at 212 and is shorter than the predetermined period T, i.e. $t_2 < T$, the change in cyclic variation S has a positive amplitude which is again greater than the first threshold value $Th_1$.

In the example described above in relation to FIG. 2d, the number of upward/downward threshold crossings for detection is set at three, and when the amplitude at the third time 213 is above/below a threshold value $Th_1$, $Th_2$ the amplitude of the change in cyclic variation S has been above/below and when the threshold values with alternating signs, i.e. have respectively been above and below the positive first threshold value $Th_1$ and the negative second threshold value $Th_2$, and the period $t_1$, $t_2$ which has passed between all the consecutive upward/downward threshold crossings is within the predetermined period T, it is deemed, according to the present invention, that a power train oscillation is detected.

Detection as described above in relation to FIGS. 2a-2d may of course be modified within the scope of the independent claims. For example, the number of upward/downward crossings of the thresholds $Th_1$, $Th_2$ may be any appropriate number. Detection may therefore take place at one or more upward/downward crossings of the thresholds $Th_1$, $Th_2$. As described above in relation to FIG. 2d, detection may for example take place at three upward/downward crossings with alternating signs. However, the number of upward/downward crossings of the thresholds $Th_1$, $Th_2$ for detection of power train oscillation may also be set, for example, at four, in which case the period $t_3$ between the upward crossing at the third time 213 and the downward crossing at the fourth time 214 when the negative second threshold value $Th_2$ is again crossed may likewise not be longer than the predetermined period T for detection to take place.

The sequence of upward/downward threshold crossings may also be altered so that the first crossing of a threshold takes place downwards, i.e. the amplitude of the change in cyclic variation S goes below the negative second threshold value $Th_2$.

Generally, the reliability of detection is increased by increasing the predetermined number of upward/downward threshold crossings. However, increasing them means that detection is somewhat delayed. The system may therefore be calibrated differently for different applications and to meet different requirements as regards reliability and delay of detection.

Damping of power train oscillations according to the invention on the basis of the change in cyclic variation S is exemplified below, using schematic and non-limitative examples of signals to explain the invention.

Figure 3A:
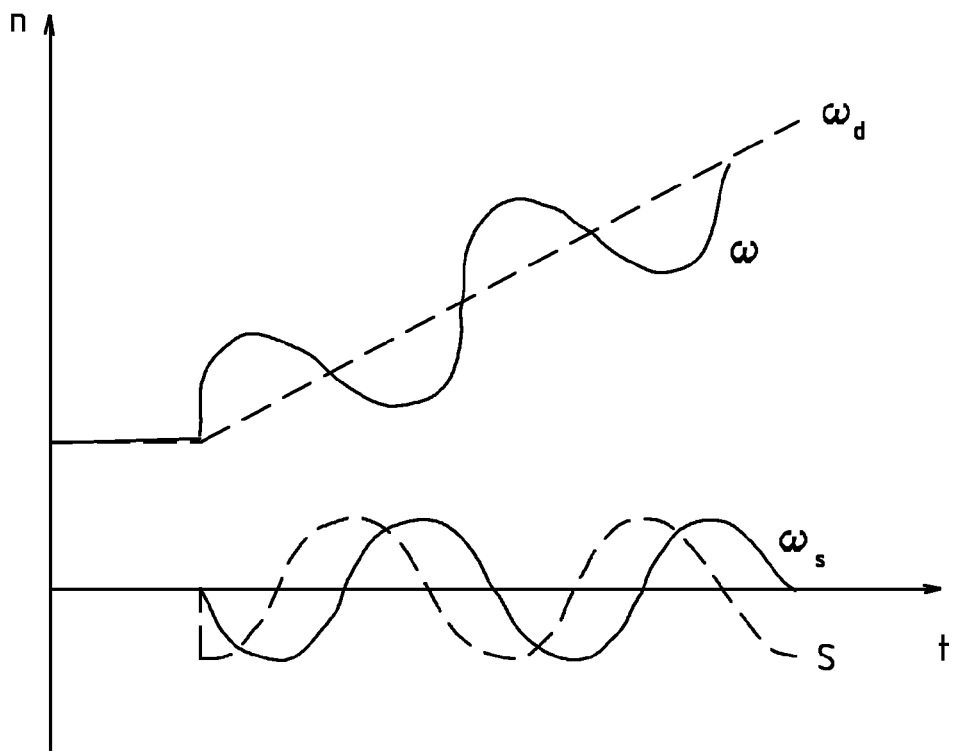
FIG. 3b depicts measured damping of a power train oscillation.

FIG. 3a plots schematically an example of a desired prime mover rotation speed $\omega_d$ (broken line) against time, and an example of a prime mover rotation speed $\omega$ (continuous line). It also plots the inverted version of the superimposed cyclic variation $\omega_s$ (continuous line) and the change in cyclic variation S (broken line) which is arrived at by derivation of the inverted version of the superimposed cyclic variation $\omega_s$.

As FIG. 3a clearly indicates, the change in cyclic variation S is displaced in time from the inverted superimposed cyclic variations $\omega_s$. The fact that the change in cyclic variation S is arrived at by derivation of the inverted superimposed cyclic variations $\omega_s$ means also that the change in cyclic variation S is greatest, i.e. has the greatest positive and negative amplitudes, when the rotation speed $\omega$ respectively increases and decreases most. The change in cyclic variation S thus reaches greatest amplitude when the rotation speed $\omega$ changes most.

In other words, the change in cyclic variation S for the inverted superimposed cyclic variations $\omega_s$ will be substantially in counterphase to a corresponding change in cyclic variation in the rotation speed $\omega$, i.e. be in counterphase to a corresponding derivative of this speed. This may be also be expressed as the change in cyclic variation S for the inverted superimposed cyclic variations $\omega_s$ being substantially inverted relative to a corresponding change in cyclic variation for the rotation speed $\omega$. The change in cyclic variation S being here substantially in counterphase, i.e. substantially inverted, relative to a corresponding change in cyclic variation (time derivative) for the rotation speed $\omega$ is because the rotation speed $\omega$ according to the invention is subtracted from the desired rotation speed $\omega_d$ in arriving at the change in cyclic variation S.

An effect of this, when the change in cyclic variation S is thereafter used to create an oscillation-damping torque request M to the prime mover 101 of the vehicle 100, is that the oscillation-damping torque request M assumes a relatively smallest value when the rotation speed $\omega$ increases most. This means that power train oscillations can be damped out very effectively by applying the present invention.

Figure 3B:
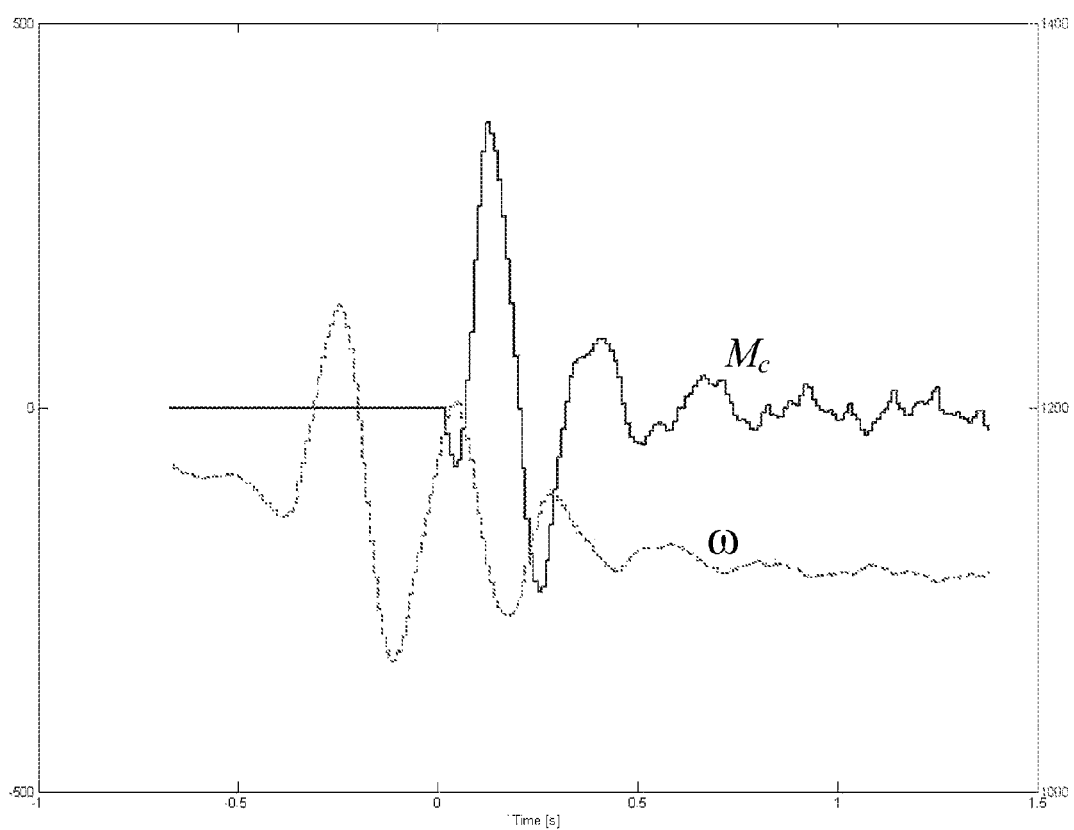

FIG. 3b depicts measured data from a vehicle when the method for damping of power train oscillations according to the invention is activated. The continuous line represents here the torque contribution $M_c$ from the present invention, i.e. signal 513 in FIG. 5 below. The broken line represents the prime mover rotation speed $\omega$. The measured data show clearly that damping of the oscillations according to the invention is activated when power train oscillations are detected, i.e. when the change in cyclic variation S has crossed the thresholds with alternating signs a certain number of times and consecutive threshold crossings are separated in time by not more than the predetermined period T. The diagram shows clearly that the torque contribution $M_c$ from the method according to the invention is based on the derivative of the superimposed cyclic variation $\omega_s$ and is therefore displaced in time towards the rotation speed $\omega$ in such a way that the waveform of the torque contribution $M_c$ is substantially inverted and strengthened in relation to a change in cyclic variation (derivative) of the rotation speed $\omega$, whereupon the oscillations can be effectively damped out.

Figure 4:
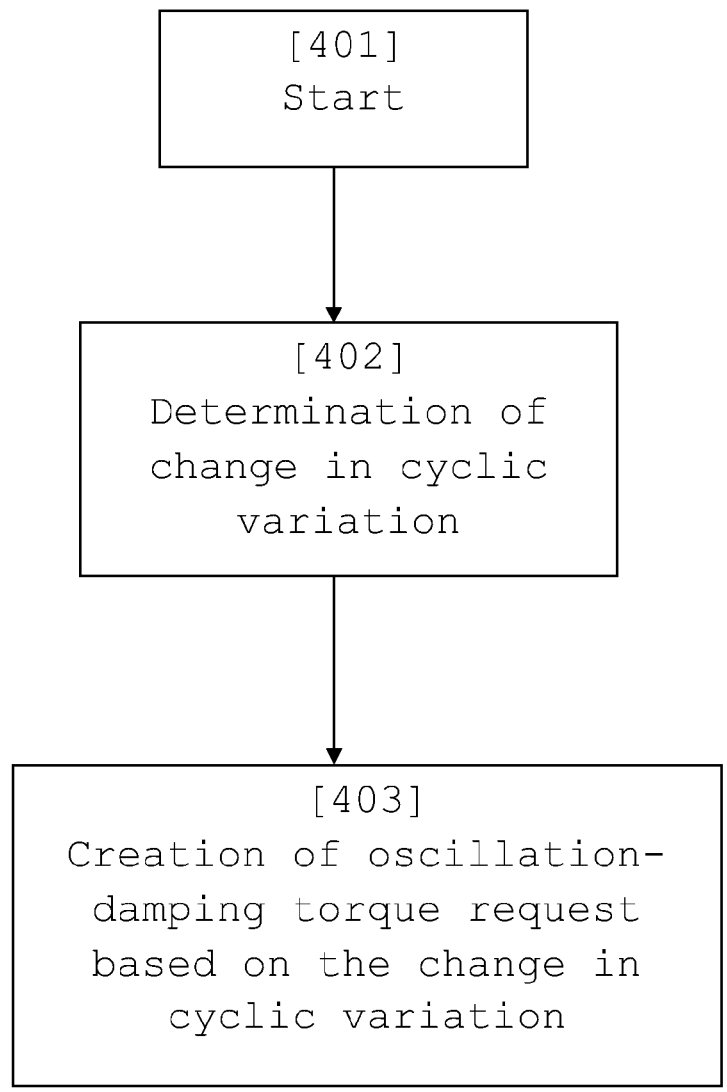
FIG. 4 is a flowchart for detection and damping of a power train oscillation.

FIG. 4 is a flowchart for the method according to the invention. As a first step 401, the method begins. As a second step 402, a change in cyclic variation S in the rotation speed $\omega$ of the prime mover 101 is determined.

As a third step 403 of the method, an oscillation-damping torque request M is created. This torque request M is given an oscillation-damping characteristic by using the change in cyclic variation S determined in the second step 402 of the method.

According to an embodiment of the invention, the method comprises also a further step after the second step 402 and before the third step 403. In this further step a power train oscillation is detected on the basis of the change in cyclic variation S. According to an embodiment of the invention, the power train oscillation is deemed detected if for a predetermined number of times the amplitude of the change in cyclic variation S is alternatively above a positive threshold value $Th_1$ and below a negative threshold value $Th_2$ and each pair of consecutive upward/downward crossings of the thresholds take place within a predetermined period T.

The present invention relates also to a system for damping of a power train oscillation in a vehicle 100 provided with an prime mover 101 which rotates at a speed $\omega$, also called rotation speed $\omega$ or prime mover rotation speed $\omega$. The system comprises a determination unit and a torque unit. The determination unit is adapted to determining the pattern of the change in cyclic variation S in the rotation speed $\omega$. The torque unit, which demands torque from the prime mover 101, is adapted to using the change in cyclic variation S to give this torque request M an oscillation-damping characteristic, as described above in relation to the method according to the invention.

According to the present invention, the system comprises also a detection unit adapted to detecting whether there is a power train oscillation. According to an embodiment of the system for the invention, the detection unit is adapted to deeming that there is a power train oscillation if the change in cyclic variation S has an amplitude which for a predetermined number of times is alternately above a positive threshold value $Th_1$ and below a negative threshold value $Th_2$ and if all of the pairs of consecutive upward/downward threshold crossings occur within a predetermined period T, as described above in relation to the method according to the invention.

Figure 5:
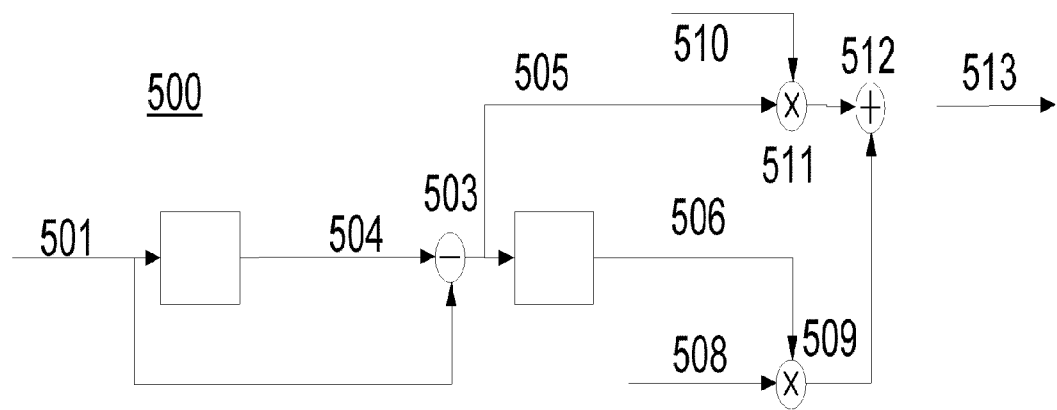
FIG. 5 is a connection diagram for damping of a power train oscillation.

FIG. 5 is a schematic circuit diagram 500 for a possible implementation of damping according to the invention. A prime mover rotation speed $\omega$, which may for example be measured by the sensor 116, is conveyed to a filter 502 and a subtraction unit 503 by being connected to them in the form of an input signal 501.

As described above, the desired rotation speed $\omega_d$ is arrived at by the signal representing the rotation speed $\omega$ being filtered by the filter 502. The desired rotation speed $\omega_d$ thus serves as an output signal 504 from the filter 502 and may be regarded as an at least semi-static component of the rotation speed $\omega$.

In the subtraction unit 503, the rotation speed ω is subtracted from the desired rotation speed $\omega_d$, and the inverted superimposed cyclic variation $\omega_s$ is extracted as an output signal 505 from the subtraction unit 503.

As mentioned above, power train oscillations can be detected by analysis of a change in cyclic variation S of the rotation speed ω 501 of the prime mover 101. This change in cyclic variation S is obtained as an output signal 506 from a derivation unit 507 in which the inverted superimposed cyclic variation $\omega_s$ is time-derived.

The change in cyclic variation S is then multiplied by an amplification factor $A_1$ in a multiplier 509, the amplification factor $A_1$ serving therein as an input signal 508, and is added in an adder 512 to an amplified version of the inverted superimposed cyclic variation $\omega_s$, the latter having been amplified by an amplification factor $A_2$ in a multiplier 511, which amplification factor $A_2$ serves therein as an input signal 510. The amplification factors $A_1$, $A_2$ may be constant and/or variable.

An output signal 513 from the adder 512 imparts a torque contribution $M_c$ to the torque request M to the prime mover 101. By the invention this torque contribution $M_c$ is provided with an oscillation-damping characteristic which may be used to damp power train oscillations out when this torque contribution $M_c$ is added to an original torque request $M_o$ which is for example based on signals from an accelerator pedal and/or a cruise control, as described above.

Constant values for one or more of these amplification factors $A_1$, $A_2$ may be arrived at empirically and be calibrated in the vehicle by experiment.

According to an embodiment, one or more of these amplification factors $A_1$, $A_2$ take the form of standardised values with magnitudes appropriate to avoiding too large values of the output signal 513, i.e. for the torque contribution M. This may for example be done by standardising the amplification factors $A_1$, $A_2$ by means of a maximum permissible value X for the output signal 513.

If the output signal 513 resulting from the addition 505*510+506*508 has a larger value than the maximum permissible value X, this standardisation may for example be done as follows:

508'=508*(X/(505*510+506*508))

510'=510(X/(505*510+506*508))

in which 508' and 510' are respective standardised input signals related to standardised amplification factors $A_1'$ and $A_2'$. The values for the standardised input signals 508' and 510' may be determined during or after the detection of power train oscillations, since the output signals 505, 506 are already available at the time of detection. If the standardised input signals 508' and 510' are determined during the detection phase, i.e. before the output signal 513 is extracted, they may be standardised towards the largest conceivable value which the output signal 513 would have if the damping of power train oscillations is activated.

If the output signal 513 does not have a larger value than the maximum permissible value X, the non-standardised input signals 508 and 510, which have the respective non-standardised amplification factors $A_1$ and $A_2$, are used.

As described above, a person skilled in the relevant art will appreciate that the subtraction of the prime mover rotation speed ω from the desired prime mover rotation speed $\omega_d$ to arrive at the inverted superimposed cyclic variation $\omega_s$ may also be done in other ways than specifically by the subtraction unit 503. For example, an inverter may be used in combination with an adder to perform the same function. What is important here is that the torque contribution be given the oscillation-damping characteristic that its pattern is substantially inverted and displaced in time relative to the superimposed cyclic variations of the prime mover rotation speed ω, which a person skilled in the relevant art will appreciate can be done in various different ways.

Figure 6:
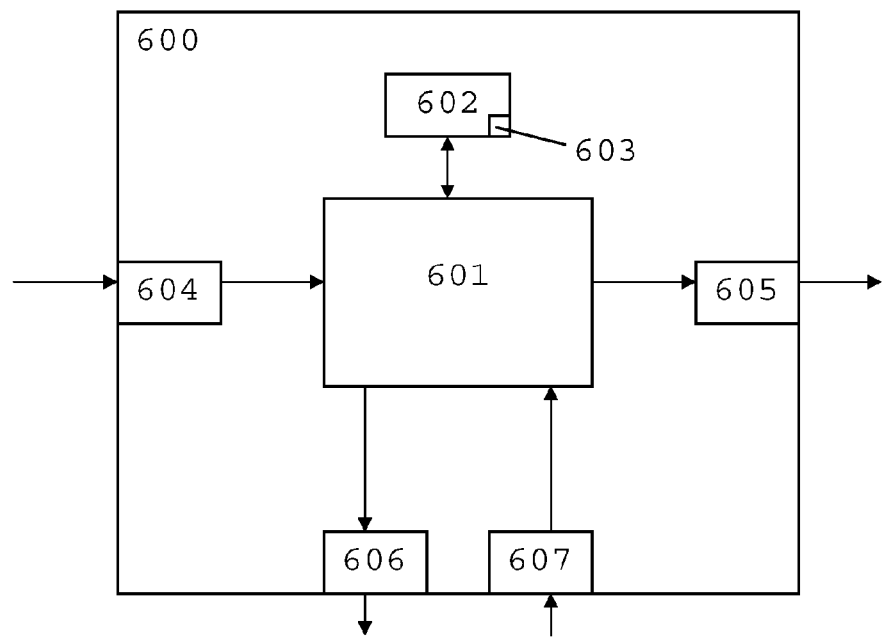
FIG. 6 depicts a control unit.

FIG. 6 depicts a control unit according to the present invention. For the sake of simplicity, it shows only one control unit 600, but vehicles of the type here concerned often have a relatively large number of control units, e.g. for control of prime mover, gearbox etc., as a person skilled in the relevant art in the technical field are well aware.

The present invention may therefore be implemented in the control unit 600 but may also be implemented wholly or partly in one or more other control units on or outside the vehicle. Control units of the type here concerned are normally adapted to receiving sensor signals from various parts of the vehicle. The control signals generated by control units normally depend also both on signals from other control units and on signals from components. In particular, the control unit is adapted to receiving signals from a sensor 116 for prime mover rotation speed, which may for example be situated close to the clutch 106.

Control units of the type here concerned are also usually adapted to delivering control signals to various parts and components of the vehicle, e.g. in the present example to the prime mover control unit in order to demand/order control of its torque.

Control is often governed by programmed instructions which typically take the form of a computer programme which, when executed in a computer or a control unit, causes the computer/control unit to effect desired forms of control, e.g. method steps according to the present invention. The computer programme usually takes the form of a computer programme product 603 which is stored on a digital storage medium 602, e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. By altering the computer programme's instructions it is therefore possible to modify the behaviour of the vehicle in a specific situation.

The control unit 600 is further provided with respective devices 604, 607, 605 and 606 for receiving and sending input and output signals. These input and output signals may comprise waveforms, pulses or other attributes which the input signal receiving devices 604, 607 can detect as information and which can be converted to signals processable by the calculation unit 601. These signals are then conveyed to the calculation unit 601. The output signal sending devices 605, 606 are arranged to convert signals received from the calculation unit 601 in order, e.g. by modulating them, to create output signals which can be conveyed to other parts of the system, e.g. to the prime mover 101, for damping of power train oscillations.

Each of the connections to the respective devices for receiving and sending input and output signals may take the form of one or more from among a cable, a data bus, e.g. a CAN (Controller Area Network) bus, an MOST (Media Orientated Systems Transport) bus or some other bus configuration, or a wireless connection. The connections for input signals and output signals, and between the filter 502, derivation unit 507, subtractor 503, multipliers 511, 509 and adder 512 depicted in FIG. 5 may take the form of one or more of these cables, buses or wireless connections.

A person skilled in the relevant art will appreciate that the aforesaid computer may take the form of a calculation unit 601 and that the aforesaid memory may take the form of the memory unit 602.

A person skilled in the relevant art will also appreciate that the above system may be modified according to the various embodiments of the method according to the invention. The invention relates also to a motor vehicle 100, e.g. a truck or bus, provided with at least one system according to the invention.

The present invention is not restricted to the embodiments of it described above but relates to and comprises all embodiments within the protective scope of the attached independent claims.

The invention claimed is:

1. A method for damping a power train oscillation in a vehicle provided with a prime mover, wherein the prime mover imparts a torque related to a torque request M provided to the prime mover from a controller and the prime mover rotates at a speed $\omega$;
the method further comprising:
    determining with the controller a change in cyclic variation S in the rotation speed $\omega$ of the prime mover; and
    using the cyclic variation S in the controller to give the torque request M an oscillation-damping characteristic.

2. The method according to claim 1, further comprising wherein the torque request imparted is an original torque request determining the oscillation-damping characteristic by adding a change in the cyclic variation S, and multiplying the change by at least one amplification factor $A_1$, and adding the multiplied change to the original torque request $M_o$.

3. The method according to claim 2, wherein the original torque request $M_o$ provided to the prime mover originates from at least one of,
    an accelerator pedal; and
    a cruise control of the vehicle.

4. The method according to claim 1, further comprising determining the oscillation-damping torque request M only when the power train oscillation has been detected.

5. The method according to claim 4, further comprising detecting the power train oscillations on the basis of the change in cyclic variation S.

6. The method according to claim 5, wherein the detection is deemed to show that there is a power train oscillation if for a selected number of times the amplitude of the change in cyclic variation S is alternately above a positive threshold value $Th_1$ and below a negative threshold value $Th_2$ and if all of the consecutive upward crossings of the positive threshold value $Th_1$ and the connective downward crossings of the negative threshold value $Th_2$ are separated in time by not more than a predetermined period T.

7. The method according to claim 1, wherein the change in the cyclic variation S is based on the rotation speed $\omega$ of the prime mover.

8. The method according to claim 7, wherein the rotation speed $\omega$ comprises a desired rotation speed $\omega_d$ and a superimposed cyclic variation.

9. The method according to claim 8, further comprising determining the desired rotation speed $\omega_d$ by filtering the rotation speed $\omega$.

10. The method according to claim 8, further comprising determining an inverted version of the superimposed cyclic variation $\omega_s$ by subtracting the rotation speed $\omega$ from the desired rotation speed $\omega_d$.

11. The method according to claim 10, further comprising determining the change in cyclic variation S by time derivation of the inverted version of the superimposed cyclic variation $\omega_s$.

12. The method according to claim 8, further comprising determining an inverted version of the superimposed cyclic variation $\omega_s$ by a model of the inverted version of the superimposed cyclic variation $\omega_s$.

13. The method according to claim 1, further comprising determining the rotation speed $\omega$ by at least one of a sensor configured for detecting the rotation speed $\omega$; and a model for the rotation speed $\omega$.

14. A non-transitory computer readable medium encoded with a computer program for damping of a power train oscillation in a vehicle provided with a prime mover such that when the program code is executed in a computer, the execution causes the computer to
    determine a change in cyclic variation S in the rotation speed w of the primer mover; and
    use the cyclic variation S to give a torque request M to the primer mover with an oscillation damping characteristic.

15. A system for damping a power train oscillation in a vehicle provided with a prime mover, wherein the prime mover is configured to impart a torque related to a torque request M provided to the prime mover, the prime mover rotates at a speed $\omega$;
the system further comprises:
    a determination unit configured for determining a change in cyclic variation S in the rotation speed co of the prime mover; and
    a torque unit configured for using the change in the cyclic variation S to give the torque request Man oscillation-damping characteristic.

16. The system according to claim 15, wherein the torque unit is configured for adding the change in cyclic variation S, multiplied by at least one amplification factor $A_1$, to an original torque request $M_o$, to the prime mover for obtaining the oscillation-damping characteristic.

* * * * *